C. S. HARDY.
APPARATUS FOR COOLING LARD, ETC.
APPLICATION FILED OCT. 22, 1919.
1,405,584.
Patented Feb. 7, 1922.
4 SHEETS—SHEET 1.
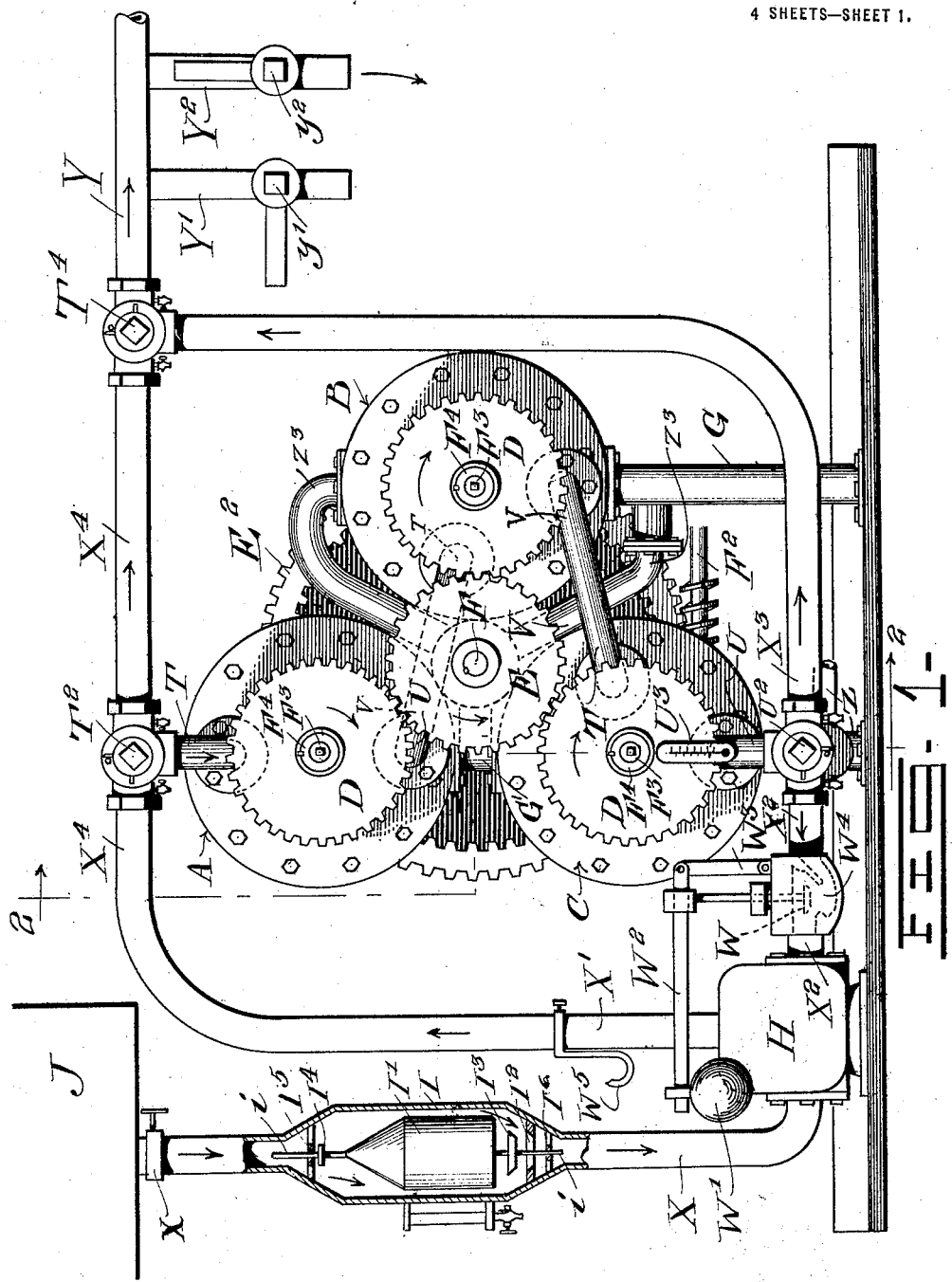
WITNESSES
Wynne Johnson
G. S. Brock
INVENTOR
Charles S. Hardy
BY Munn & Co.
ATTORNEYS

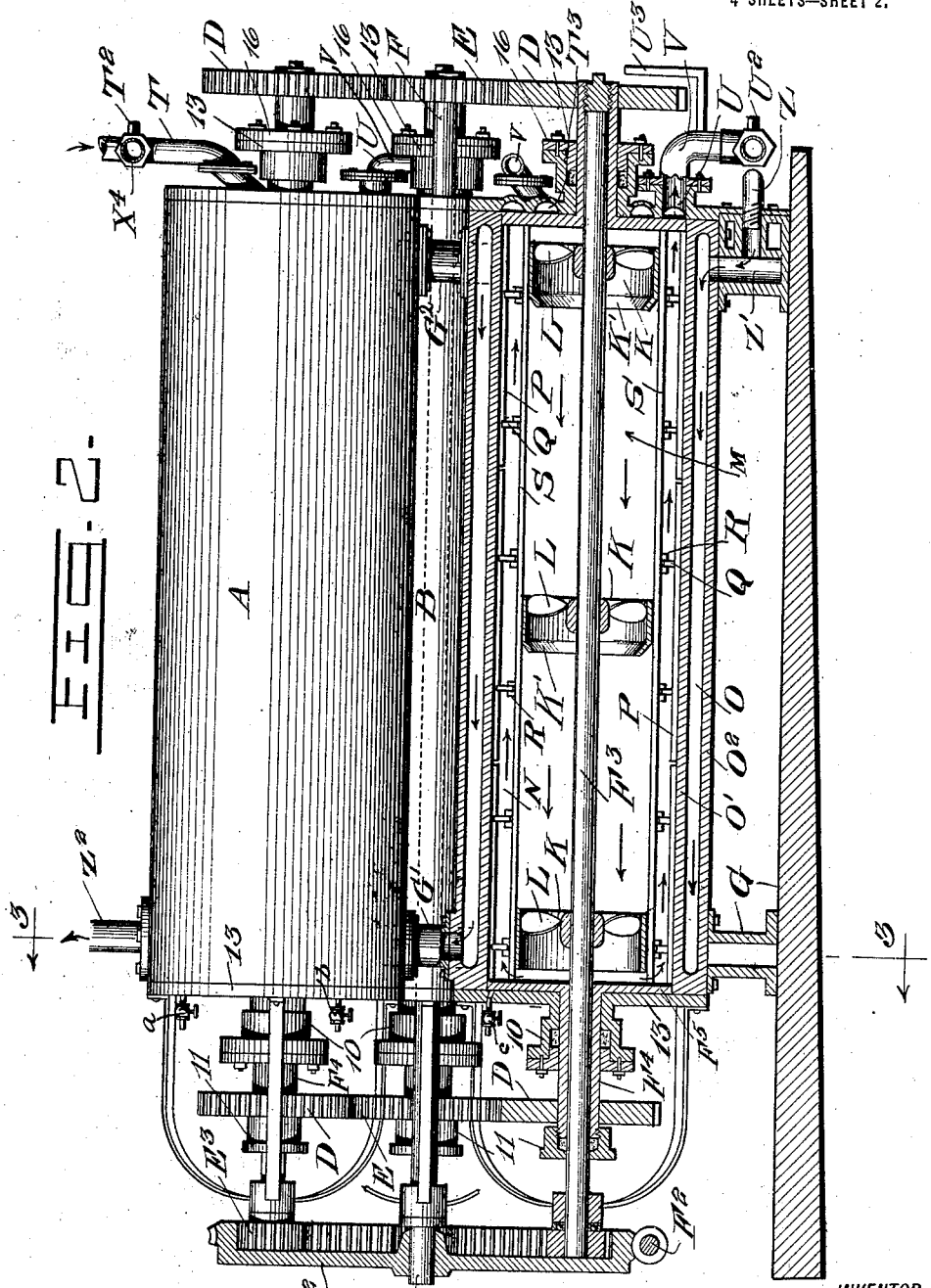

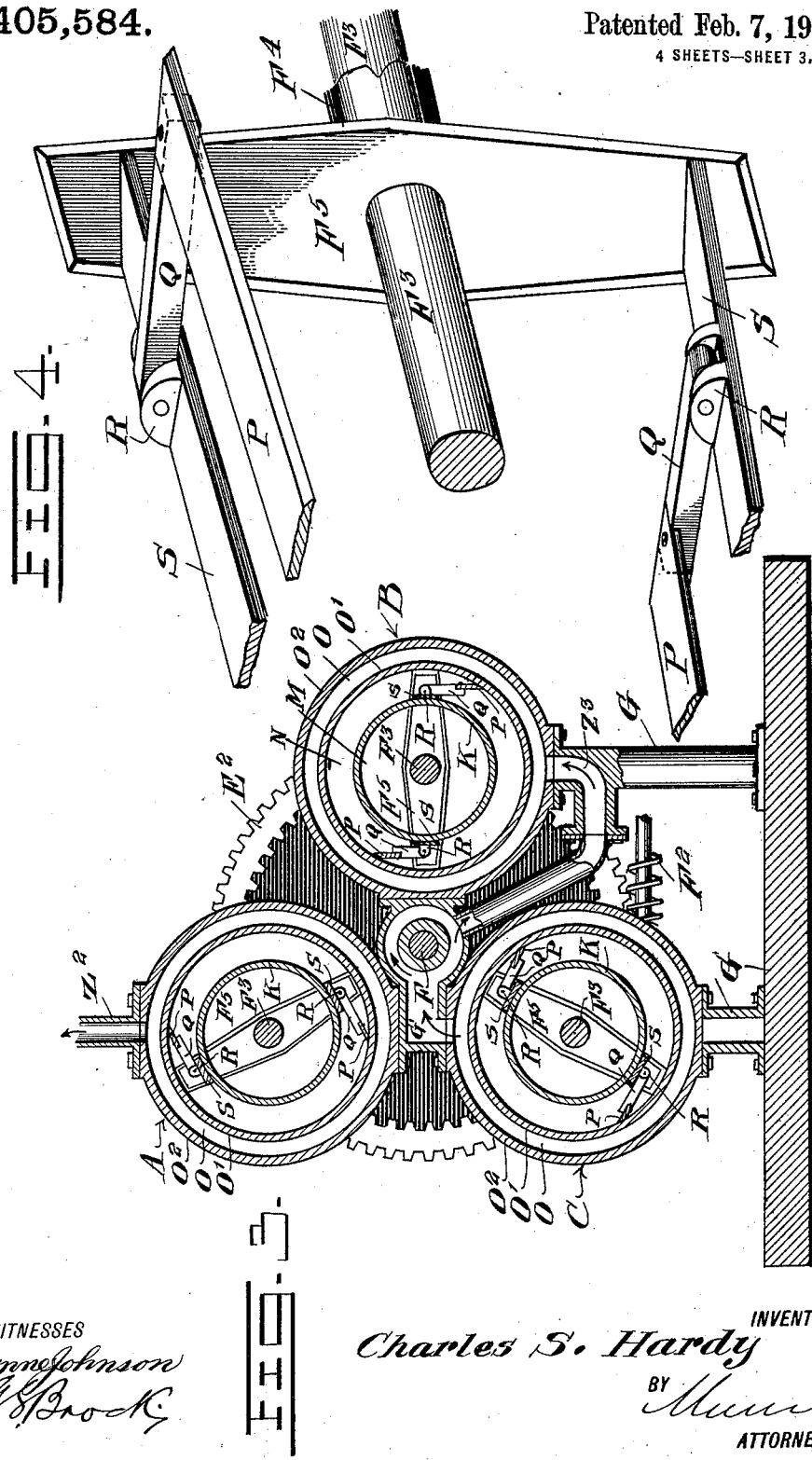

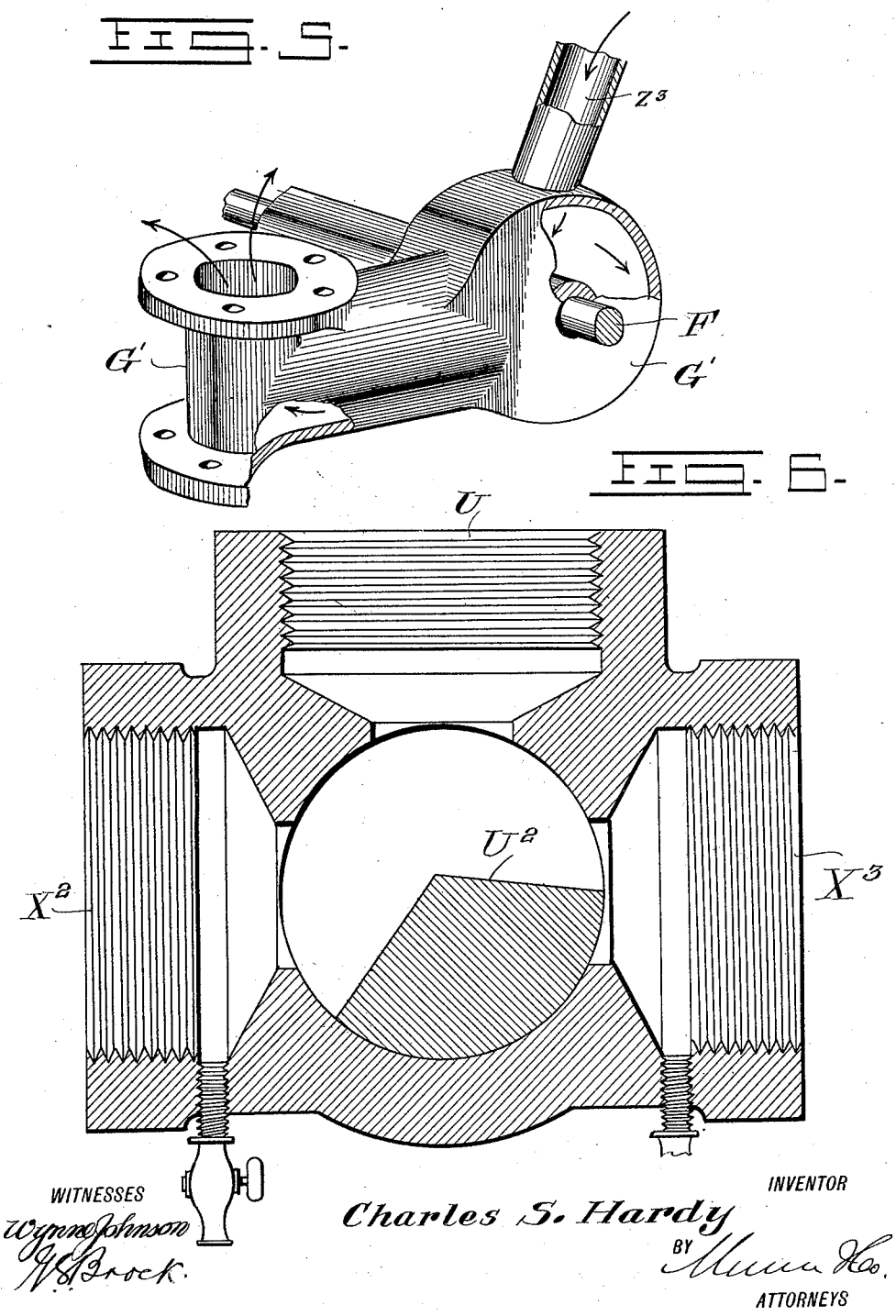

UNITED STATES PATENT OFFICE.

CHARLES S. HARDY, OF SAN DIEGO, CALIFORNIA.

APPARATUS FOR COOLING LARD, ETC.

1,405,584. Specification of Letters Patent. Patented Feb. 7, 1922.

Application filed October 22, 1919. Serial No. 332,539.

*To all whom it may concern:*

Be it known that I, CHARLES S. HARDY, a citizen of the United States, and a resident of San Diego, in the county of San Diego and State of California, have invented certain new and useful Improvements in Apparatus for Cooling Lard, Etc., of which the following is a specification.

My invention relates to methods and apparatus designed for cooling melted lard in lard factories and more particularly to an apparatus for cooling and mixing of fats in a uniformly homogeneous product.

The lard as it comes from the tanks or kettles in such factories must be cooled before it is put into the shipping packages, and especially in the case of compound lards, as they are termed, composed of animal and vegetable fats or oils, it is much better that the cooling be done in such a manner as to avoid crystallization as much as possible, and also in preventing the admission of air to the product while being cooled, thus avoiding the mixing of air with the product itself, for warm air coming in contact with cooled lard causes condensation, and in such condensation there are impurities and moisture, all of which tend to deteriorate the lard and cause it to spoil in a short time.

The invention consists in the improved means for cooling and blending the lard or lard material and the various devices and combinations of devices set forth in the specification and shown in the drawings forming a part hereof and more definitely pointed out in the claims.

In the accompanying drawings:

Figure 1 is an end elevation of the device;

Figure 2 is a longitudinal section taken on line 2—2 of Figure 1;

Figure 3 is a vertical transverse section on line 3—3 of Figure 2;

Figure 4 is an enlarged perspective view of one end of scraping means;

Figure 5 is an enlarged perspective, showing standards $G^1$; and

Figure 6 is an enlarged section of one of the three-way cocks.

While the inventive idea is susceptible of expression in a variety of forms, I have selected a practical embodiment as shown in the drawings by referring to which it will be seen that I employ three cooling and blending cylinders which I shall designate as A, B, and C, arranged around a common drive shaft F at angles of 120° to each other, the cylinders being set at a slight inclination to the horizontal with their front ends lower than their rear ends, and the shaft F is mounted on standards $G^1$ and $G^2$.

Referring to Figure 2, which shows a longitudinal section through one of the cylinders, it will be seen that they (the cylinders being alike), are composed of concentric walls $O^1$ and $O^2$ forming an annular brine chamber O, the outer cylinder having heads 13. Within the cylinder $O^1$ are cages with shaft ends, composed of shafts $F^4$ cross arms $F^5$ connected together by longitudinal bars S; rigidly held within the cage and by the bars to which they are riveted or otherwise secured are three housing rings K spaced apart, two of which have their discharge ends contracted or chocked at K', the purpose of which will later appear.

Attached to bars S are knife-scrapers P, made in sections and held in position by bars Q hingedly connected to female hinge joints R riveted to bars S. It should be noted (see Figure 4), that the blades P are not hung to the free edges of bar S but rather back therefrom which prevents blade P from falling out of position, the current caused by the rotary movement of the propellers L, forcing said scraper knives solidly against the wall O', where they are held by centrifugal action while the apparatus is in operation. The structure just described forms the inside cage, the shaft $F^4$ extending through heads 13 and stuffing box 10.

Attached to this shaft $F^4$ are cog wheels D. Shaft $F^4$ being hollow admitting shaft $F^3$, and upon this shaft $F^3$ are mounted propellers L, said propellers being positioned to revolve within the housing rings K, $F^3$ revolving in one direction at a speed of about 200 R. P. M., while shaft $F^4$ revolves in the opposite or reverse direction at a speed of about 50 R. P. M. The motions of both shafts $F^3$ and $F^4$ are derived from main shaft F to which the internal gear $E^2$ and the external gear E are fixed at opposite ends. This internal gear $E^2$ drives shaft $F^3$ while external gear E meshing with gear D drives hollow shaft $F^4$, all of which are turned by an external worm placed on the periphery of gear $E^2$ and operated by worm gear $F^2$.

The lubrication of the bearings of the apparatus is done by the internal pressure of the lard passing out through such bearings in heads 13, and the shaft $F^3$ is lubricated by lard passing through its bearing in shaft $F^4$ which is kept tight by stuffing box 11, and the shaft $F^4$ is kept tight by stuffing box 10.

It will be readily understood that with the stuffing boxes set to take care of 100 pounds of pressure they will also take care of the vacuum produced by the falling of lard owing to its construction, in practically an open chamber, and the continual agitation while cooling which prevents it from congealing while cooling, without entrance of the air.

The hot lard to be cooled is placed in a receiving tank or reservoir J, which will hold, say, 9000 pounds, standing at a temperature of 120° F. Extending downwardly from this reservoir is a pipe X controlled by a gate valve $x$; pipe X is connected to a regulating chamber I which has in it an air-tight float $I'$ having stems at its upper and lower ends, $i$ and $i'$, which pass through the guides $I^5$ and $I^6$; the upper stem $i$ has a button or stop $I^4$ on it which limits the upward movement of the float while the lower stem $i'$ carries a beveled valve $I^3$, which may engage the beveled valve seat $I^2$ placed above the lower stem guide. From the regulating chamber extends downwardly a continuation of pipe X, which is connected with the pump H which has extending upwardly from it the pipe $X'$; another pipe $X^2$ communicates with the opposite end of pump H and within pipe $X^2$ is placed an intercepting pressure regulating valve W, this valve being normally held to its seat by a weight $W'$ mounted at the free end of a lever $W^2$, the opposite end of said lever being pivoted to a standard $W^3$ projecting from the casing $W^4$ of the valve W.

The pipe $X'$ which extends upwardly from the pump H is connected with by-pass pipe $X^4$ which has therein a three-way cock $T^2$ controlling said pipe $X^4$ and the inlet pipe T to the cylinder A. The by-pass pipe is extended beyond the three-way cock $T^2$ and connects with the draw off header Y through another three-way cock $T^4$; the draw off header is provided with any desired number of draw off spouts $Y^1$ $Y^2$ controlled by draw off cocks $y^1$ and $y^2$ by which the cooled lard is run into the receptacles in which the lard is to be packed for shipment.

The pipe $X^2$ which connects with the pump H and has the pressure regulating valve W therein is connected with pipe $X^3$ which also leads to the header Y, and has at its junction with said pipe $X^3$ a three-way cock $U^2$ which controls pipes $X^2$, $X^3$ and the outlet pipe U from cylinder C.

The inlet pipes T enter the heads 13 of the cylinders and communicate with grooves $T^3$ in front heads 13 to approximately the center of the cylinder. The outlet from each cylinder is represented by the character U.

The brine inlets are designated by the character Z, the brine entering at the lower end of the device at Z and passing through branch pipes $Z'$ successively into the annular brine chambers O of the several cylinders A, B and C and discharging at the upper and rear part of the device at $Z^2$.

The lard to be cooled enters at inlet T in front head 13 thence into groove $T^3$ in front end of head 13 to approximately the center of the cylinder, the propellers L driving the lard as indicated by arrows towards the back end of the cylinder, the lard striking the back end heads 13 being diverted into space N, such lard returning along inner wall of cylinder $O'$ which is cooled by cold brine jacketed in chamber O the inlet of which is shown under $Z^1$, being at the bottom, and the outlet at $Z^2$ being at the top.

The propellers L while driving the lard also causes a rotary motion of the same through a longitudinal zone throughout the cylinder travelling with great velocity caused by choked housing rings K; the cage, however, travelling in the opposite direction to that of the propellers, the knife scrapers attached prevent the lard from congealing on walls, yet do not materially obstruct the rotary motion of the lard, as it is allowed to pass between the parts by bars Q.

To illustrate the operation of the apparatus we will assume cylinders A, B and C to be empty and ready for operation:

The lard to be processed is in receiving tank J, the gate valve $x$ being opened, the lard passes down through pipe X into regulator I, thence into pump H, thence by pipe $X^1$ into cylinder A by inlet T, thence out of outlet U through into cylinder B at inlet T, thence out of U outlet through V and into inlet T of cylinder C, thence out of outlet U of said cylinder C into pipe $X^2$ by way of three-way cock $U^2$, which has been closed so that lard will not go into pipe $X^3$; it then returns to pump H through pipe $X^2$ in which is the intercepted pressure valve W. For example, when lard is pumped up to a pressure of 100 pounds, regulating valve W opens and allows it to return to the suction end of the pump; lard will then circulate through the cylinders, as the head of the lard in tank J being greater than that in the cylinders, the pump will receive all its suction from cylinders rather than from receiver tank J. The brine in the meantime is turned on and enters at pipe Z into opening branch $Z^1$ which is at the bottom of cylinder C and goes out of the top at the back end of the cylinder C into the bottom of the back end of cylinder B through by-pass $Z^3$, then out of the top at the front end of cylinder B into the bottom end at the front of cylinder A, thence out of the top of cylinder A at the back end, and at $Z^2$. The brine is kept in constant circulation by a special brine pump (not shown), and the lard is kept in constant circulation by pump H, and the cage and the impellers inside of the cylinders keeps the lard, both longitudinally and circumferentially, in constant motion while being cooled. $U^3$ representes a thermometer which is attached at U of cylinder C and when the desired temperature is reached, three-way cock $U^2$ is so opened as to allow about one-third ($\frac{1}{3}$) of the lard stream to pass into pipe $X^3$, and the other two-thirds ($\frac{2}{3}$) to pass into pipe $X^2$.

The lard when it enters regulating chamber I will fill the same until float $I^1$ will raise to open check-valve $I^3$, as shown in the drawings (Figure 1). Lard will then pass into pump H thence by pipe line $X^1$ to three-way cock $T^2$, filling cylinders A, B, and C. Pressure valve W will then be opened as shown; the incoming lard has forced all the air to all high points of the apparatus, which will be found to be the top of cylinders A, B and C at their back ends, and at such ends the cylinders are provided with air pet cocks $a$, $b$, and $c$. With the air thus expelled it will readily be seen that there is no further possibility of air entering during operation, as it is sealed by the body of lard in the receiving tank J.

The pump is now started and pressure valve W has been released so that it will only be raised by the pressure of lard coming through $X^2$.

The agitating apparatus is then started by applying power from the motor to gear wheel $E^2$ which operates main shaft F, the gears E of shaft F drive gears D at both front and back ends of the cylinders A, B, and C, respectively, and gear-wheel $E^2$ drives propeller shaft to gear $E^3$ in an opposite direction, all of which gives the lard a to and fro, and also a rotary motion, and the pump maintains a constant circulation from one cylinder to the other.

Pet cocks are also provided for the brine at its high points to expel air that may have been previously collected in the brine chambers.

The brine is now in continuous circulation, likewise the material being processed, and when a temperature of 60° F. is reached, as indicated on thermometer $U^3$, the lard is then ready to pass to drawoff header Y; this is done by opening three-way cock $U^2$, the assumed capacity of the apparatus being 9000 pounds, per hour, lard pump capacity 60 gallons per minute, and drawing off through header Y, 20 gallons per minute. This leaves return through pipe $X^2$ of 40 gallons per minute, sixty degrees temperature, and 20 gallons of hot lard per minute at 120° F., completing the 60 gallons per minute passing through the pump H. This lard in question will leave the pump by way of pipe $X^1$ at the rate of 60 gallons per minute standing at 80° F.

The assumed brine necessary to perform this work would be the 60 gallon brine per minute to enter at zero Fahrenheit and leave the cylinders at 20° Fahrenheit, there having been absorbed 20 degrees from the brine.

From the above it will be readily seen that air can not enter the apparatus and that lard is being cooled by steps and that the coldest brine is striking the coldest lard and that the cooled lard itself is performing a part of the cooling; it will also be seen that the hottest lard enters the top cylinder and the coldest lard leaves the bottom cylinder, thus avoiding sudden changes, and causing the mixture to cool step by step; furthermore, the lard is being constantly agitated while under continual circulation and under pressure during all this.

The result of these above mentioned steps and operations is to produce a homogeneous product. This is particularly advantageous in making lard substitute, where the melting point of stearine is 120 degrees, while the melting point of lard is between 90 and 100 degrees.

With the process herein described a continual to-and-fro motion is secured in M and N, and also a rotary motion.

In addition to these motions a continuous circulation passing from one cylinder to another is secured, and by use of the three-way cock $U^2$ a complete regulation without the interruption of circulation, allowing to pass to header Y, lard that is sufficiently cooled, as indicated by thermometer $U^3$.

When tank J becomes empty it will be seen that float I will drop seating check valve $I^3$ on seat $I^2$ which will prevent air entering the apparatus from that direction. The three-way cock $T^4$ connecting pipe and by-pass $X^4$ with header Y can then be turned. Three-way cock $T^2$ connecting pipe line $X^1$ with by-pass $X^4$ which then closes passage to cylinder A; the weight on pressure regulating valve W is then raised and held by hook $W^5$; this causes free passage of lard from cylinders A, B, and C to the pump it falling by gravity and aid of propellers, notwithstanding it then being under a vacuum. The valves of the pump H are so constructed that they will raise by the weight of the material.

As the entire apparatus pitches or inclines downwardly to the front, it can be readily seen that all the material will fall out eventually by gravity and the pump will drive the entire product to header Y.

When the cylinders are empty, a slight amount of air can be admitted to cylinder A which will allow the pump to pump air and force out the remaining product that might be in pipe-line X¹, by-pass X⁴ or in header Y.

By arranging the brine by-pass pipes on an incline the whole apparatus assumes such a construction that its drainage is complete and the apparatus becomes self-regulating and no interruption or stoppage of flow is necessary, it being simply a matter of holding the material in the various receptacles until it is properly cooled and drawing it off in quantities as cooled.

It should be noted that the shaft arms F⁵ are finished with beveled edges of knife-like form, as plainly shown in Figure 4, and from the time the lard enters a cylinder inlet at T it can not gather upon either the heads or walls of the cylinder, for the cross arms F⁵ keep the cylinder heads clean and the sectional scrapers P keep the barrels or cylinders clear. The propellers L working inside the housing rings K keep their drive side clear as well as their inside by their velocity; one side of one propeller is driving against the other propeller which keeps the back end of the propeller clear by velocity of the lard, and the speed that the lard will attain after the section motion through space M striking against the back heads 13 and returning on the outside of rings K in space N will be at such a speed that no congealing of lard can take place.

It will also be observed that there are no corners not reached by scrapers. Even hinged bars Q will be kept clean, not only by the rotary motion but by the return motion as well, and all parts of the machine are so beveled as to give the least obstruction to either the to-and-fro motion or the circulating motion.

By arranging the cylinders symmetrically around the common center represented by the main drive shaft F and at 120 degrees apart, perfect drainage and substantial construction is obtained, and permits the agitating apparatus of all the cylinders to be directly connected to the gears of the main shaft, which gives a direct connected apparatus and all parts kept in complete time.

While I have shown this device as including three cylinders which I have found is a practical form, it must be understood that the same cooling process can be used with a single cylinder. For example, the by-pass V may be disconnected from cylinder A and connection made from cylinder A to three-way cock U² direct. The cylinder A will then be operating as a single unit.

Hence it will be understood that the essence of my invention is in an air-tight cylinder with an agitating and scraping mechanism within the same, which will cause the mixture to travel to and fro and rotate at the same time and keep in continuous circulation by means of a pump and draw-off in quantities, as fast as cooled, by a three-way cock U², all of which is done in an air-tight receptacle under pressure and which is surrounded by brine which is absorbing the heat from the enclosed mixture and that by steps practically the same as with three cylinders due to the return cooled lard coming in contact with the entering hot lard.

It will further be noted that the cocks of drawoff header Y can be completely shut off without any stoppage of the apparatus. This will simply allow more to by-pass through pressure valve W.

Referring to Figure 6, it will be noted that the centre portion of the key of three-way regulating cock U² is in circular sector form which allows the throttling of either end of the casing, without obstructing either the center or other end port of the cock casing. This permits the holding back of the lard from draw-off header until it is sufficiently cooled and letting it through only in such quantities as fast as cooled without interfering with the circulation through the cylinders.

I claim:

1. In an apparatus for cooling and homogenizing lard and lard compound, in combination, inner and outer stationary cylinders having stationary heads at each end, means for admitting hot lard at one end of said cylinders, means for discharging the cooled product from the same end of the cylinders, means for agitating and propelling the central portion of the lard mass within the cylinder in one direction, means for agitating and propelling the outer or circumferential portion of said mass in the opposite direction, and means for maintaining a continuous circulation of a refrigerating medium within the annular space between the said inner and outer stationary cylinders.

2. In an apparatus for cooling and homogenizing lard and lard compound, in combination, a supply tank for the hot processed substances, an automatic regulating chamber connected therewith, a conduit leading from said chamber, pumping means connected with said conduit, a discharge pipe leading from said pumping means, a pipe leading from said discharge pipe, a three-way cock in said last mentioned pipe, a stationary cooling and homogenizing cylinder, a branch pipe from the three-way cock and communicating with the interior of the said cylinder, an outlet pipe from said cylinder, temperature registering means at the outlet from said cylinder, a three-way cock in the cylinder outlet pipe, a second inlet pipe leading from the three-way cock of the cylinder outlet pipe to the opposite end of the pumping means, a pressure regulating valve in said last mentioned pump inlet pipe, a draw off header pipe communicating with the inlet pipe to the cooling cylinder, a discharge pipe leading from the three-way cock of the cylinder outlet, a three-way cock in said header draw off pipe, said last mentioned discharge pipe communicating with said three-way cock of the draw off header pipe, means for discharging from said draw off header, means for causing a circulation and agitation of the mass to be cooled through the said cylinder, means for operating said pump, and means for causing a continuous circulation of refrigerating fluid around said cylinder.

3. In an apparatus for cooling and homogenizing lard, in combination, a plurality of stationary cooling cylinders symmetrically grouped around a common axis and having front and rear heads, said cylinders inclining downwardly from their rear ends to their front ends.

4. In an apparatus for cooling and homogenizing lard, in combination, a plurality of stationary cylinders composed of concentric inner and outer walls providing an annular space between the same, stationary heads at the opposite ends of said cylinders closing the same and the annular space, lard inlets and outlets in the front heads of said cylinders, said cylinders grouped symmetrically around a common axis, and disposed laterally at equal angles from each other, means for propelling and agitating the lard mass within the inner cylinder in central and circumferential streams in opposite directions and at different velocities, means for driving said propelling and agitating means, and means for causing a continuous circulation of refrigerating fluid within the annular space between the concentric cylinders.

5. In an apparatus for cooling lard, in combination, a plurality of double walled cooling cylinders grouped symmetrically around a common axis, heads hermetically closing the front and rear ends of said cylinders, inlets and outlets through the front heads of the cylinders, a cooling medium continuously circulating between the double walls of the cylinders, means for causing a longitudinal and circumferential movement and agitation of the contents of the inner cylinders, and means for scraping the inner circumference of said inner cylinders and preventing congelation thereon.

6. In an apparatus for cooling and homogenizing lard and the like, in combination, a plurality of double walled stationary cylinders and heads hermetically closing the front and rear ends thereof, means for causing a continuous circulation of refrigerating fluid between said walls of the cylinders, lard inlets and outlets in the front heads of said cylinders, means for agitating and circulating the lard mass within the inner cylinder, said means including a cage comprising end scraper blades having hollow journals extending through the said cylinder heads, longitudinal bars connecting said end scrapers, housing rings, secured within said longitudinal bars, a propeller shaft journaled in said hollow journals and extending through the cylinder heads, propellers rigidly mounted on said propeller shaft within the housing rings, scraping blades pivotally mounted on said longitudinal connecting bars of the cage and adapted to be thrown and held against the inner surface of the inner cylinder by centrifugal force, and means for rotating the propeller shaft and the hollow journals simultaneously in opposite directions.

7. In an apparatus for cooling lard including an externally cooled lard receiving and circulating cylinder and agitating and propelling means within said cylinder rotating in opposite directions, and means for lubricating said agitating and propelling means, said lubricating means including hollow shafts journaled in stuffing boxes in the heads of the cylinder, propeller shafts journaled in said hollow shafts, and stuffing boxes at the outer ends of said propeller shafts.

8. In an apparatus for cooling lard, in combination, a cooling receptacle consisting of concentric cylinders having an annular space between the same, means for causing a continuous circulation of refrigerating fluid through said annular space, rotary propelling and agitating means with the inner cylinder, said means comprising a cage, spiral propelling blades within the cage, and centrifugally actuated scrapers longitudinally disposed and hinged to the periphery of said cage and contacting with the inner circumference of said inner cylinder.

9. In an apparatus for cooling lard, in combination, an exteriorly cooled air-tight cylinder, means for propelling and agitating the lard within the cylinder, and sectional scrapers carried by the agitating means and adapted to rock on an axis parallel with the axis of the propelling and agitating means, said axis and the edge of the scrapers travelling in planes concentric with the axis of the propelling and agitating means and centrifugally contacting with the inner circumference of the cylinder.

10. In an apparatus for cooling and homogenizing lard, in combination, an exteriorly cooled cylinder, means for propelling and agitating the lard in a central longitudinal stream, said means including a cage, rotatably mounted in the cylinder, choke rings mounted in the cage and spiral blade propellers revolving within said choke rings.

11. In an apparatus for cooling and homogenizing lard, in combination, an exteriorly cooled cylinder, means for propelling and agitating the lard in a central longitudinal stream, said means including a cage, rotatably mounted in the cylinder, choke rings mounted in the cage and spiral blade propellers revolving within said choke rings, a three-way draw-off cock provided with a key the center of which is in circular sector form.

CHARLES S. HARDY.

Witnesses :
 BERT M. HARDY,
 IRVING C. VEALL.